United States Patent [19]
Crawford et al.

[11] 3,923,846
[45] Dec. 2, 1975

[54] MICHAEL-TYPE ADDITION PRODUCTS OF NITROPARAFFINS

[75] Inventors: Wheller C. Crawford, Fishkill; William P. Doyle, Lagrangeville; John A. Patterson, Fishkill, all of N.Y.

[73] Assignee: Texaco Inc., New York, N.Y.

[22] Filed: June 29, 1972

[21] Appl. No.: 267,320

Related U.S. Application Data

[62] Division of Ser. No. 836,940, June 26, 1969, abandoned.

[52] U.S. Cl......... 260/404; 260/31.2 R; 260/31.8 G; 260/31.8 W; 260/32.4; 260/290 P; 260/297 R; 260/347.3; 260/404.5; 260/464; 260/478; 260/561 R; 260/590; 260/593 R; 260/607 A
[51] Int. Cl.²................. C07C 69/00; C08K 5/09
[58] Field of Search.................. 260/404, 404.5

[56] References Cited
UNITED STATES PATENTS
2,998,437   8/1961   Benton................. 260/404.5

FOREIGN PATENTS OR APPLICATIONS
906,868   9/1962   United Kingdom............. 260/404.5

OTHER PUBLICATIONS

Reinheckel et al., I, Monatsh. Chem. 98(5), 1944–1953 (1967).
Reinheckel et al., II, Chem. Ber. 95, 876 (1962).
Finkbeiner et al., Journ. Amer. Chem. Soc. 85 (1963), pp. 616–622.
Wakamatsu et al., Journ. Org. Chem., May 1962, pp. 1609–1611.

*Primary Examiner*—Ethel G. Love
*Attorney, Agent, or Firm*—Thomas H. Whaley; Carl G. Ries; Bernard Marlowe

[57] ABSTRACT

This invention concerns $\beta$-(2-carbonylhydrocarbyloxyethyl) nitroalkane products derived from the addition of nitroparaffins containing 10 to 24 carbon atoms to vinyl-type reactants. These addition products generally are useful as plasticizers for uncured polyvinyl-type polymers.

1 Claim, No Drawings

MICHAEL-TYPE ADDITION PRODUCTS OF NITROPARAFFINS

This is a division of application Ser. No. 836,940 filed June 26, 1969, now abandoned.

This invention concerns base catalyzed Michael-type additions of nitroparaffins to vinyl-type reactants to form adducts.

More particularly, this invention relates to base catalyzed addition of nitroparaffins, containing 3 or more carbon atoms to vinyl-type reactants, under anhydrous conditions in a substantially aprotic environment to produce adducts in near quantitative yields. These adducts are generally useful as bifunctional reactants and, in the case of some of higher molecular weight nitroparaffin adducts, are useful as plasticizers for vinyl polymers.

Nitroparaffins containing a methenyl, methylene or methyl group contiguous to the nitro group add to vinyl-type compounds in Michael-type additions. The adducts are usually generically catagorized as beta substituted ethylated products but the adducts with acrylonitrile also are known as cyanoethylated adducts. The usual conditions required for this type of addition are alkaline catalysts and an aqueous or alcoholic solvent environment. When the nitroparaffin reactant contains 6 or less carbon atoms, the process is rapid and produces quantitative yields at temperatures under 100°C. and at atmospheric pressures. Unfortunately, when the secondary nitroparaffins containing 10 or more carbon atoms are reacted under the same basic alcoholic or aqueous conditions, the addition takes place to a much lesser extent and can only be pushed to quantitative yields when costly pressurized systems are employed. The drop in yield is not apparently due simply to solubility differences since methanol solubilizes these higher molecular weight secondary nitroparaffins and the reaction mixture is homogenous.

Inasmuch as the higher molecular weight nitroparaffins, containing 10 to 30 carbon atoms, are potentially available in large quantities from the nitration of paraffins (particularly the vapor-liquid phase nitration of $C_{10}$ to $C_{30}$ paraffins) it is especially desirable to provide a process which could be utilized to produce useful bifunctional addition products. Particularly useful would be an addition process which could utilize both primary and secondary nitroparaffins as reactants, either in the form of discrete compounds or their unresolved mixtures, either free from inert solvent or containing large quantities of paraffinic starting materials. Ideally, this type of process would proceed readily at moderate temperatures and atmospheric pressures and would produce the products in near quantitative yields in an easily isolable form. A process combining these attributes would represent a significant advance in the art.

It is an object of this invention, among others, to provide a novel process for preparing the base catalyzed addition products of nitroparaffins and vinyl-tape reactants, in improved yield.

It is another object of this invention to provide reaction conditions wherein secondary nitroparaffins containing 10 or more carbon atoms can be added to vinyl-type compounds to produce the Michael-type addition products.

Another object of this invention is the preparation of heretofore unprepared adducts derived from the above-described reaction of vinyl-type compounds with nitroparaffins.

Other more specific objects are the preparation of novel adducts from the reaction of higher molecular weight nitroparaffins with vinyl-type compounds such as acrylonitriles, alkyl acrylates, vinyl sulfones and ketones and the like which are useful as plasticizers for vinyl polymers.

Additional objects will suggest themselves to those skilled in the art after a further reading of this disclosure.

The above objects are achieved by the novel process described below.

In practice, at least one nitroparaffin reactant is admixed with at least one equi-molar quantities of at least one vinyl-type reactant in the presence of a catalytic quantity of at least one strongly alkaline material, in an anhydrous, substantially aprotic environment, to form a reaction mixture. Then the reaction mixture is heated at a temperature and for a time until addition of the nitroparaffin to the vinyl-type compound takes place and the addition product is prepared. The product can be further reacted in situ or isolated using standard procedures of the art.

In the favored practice, at least one nitroparaffin reactant containing 10 or more carbon atoms is admixed with a slight excess of at least one vinyl-type reactant in the presence of a catalytic quantity of at least one strongly alkaline material, in an anhydrous, substantially aprotic environment, to form a reaction mixture. Then the reaction mixture is heated between 20° and 150°C. until substantial addition of the nitroparaffin to the vinyl-type reactant takes place and the addition product is prepared. The reaction mixture is neutralized with acidic material and the product separated from the solvent mixture.

In the preferred practice, a nitroparaffin mixture comprising $C_{10}$ to $C_{24}$ secondary nitroparaffins is admixed with an excess of a vinyl-type reactant in the presence of a catalytic amount of an alkaline material selected from alkali metal and alkaline earth metal hydroxides and alkoxides and the like, in an anhydrous, substantially aprotic environment to form a reaction mixture. Then the reaction mixture is heated between about 50° and 80°C. until the addition of nitroparaffin to vinyl-type reactant takes place and the addition product is produced. The reaction mixture is neutralized and treated as before.

In order to further aid in the understanding of the inventive process, the following additional disclosure is provided.

A: Nitroparaffin reactants — The nitroparaffins which can be used as reactants comprise the primary and secondary nitrated paraffins containing from 3 to 40 and higher carbon atoms and which have a methenyl, methylene or methyl group contiguous to the nitro group. Particularly preferred are the secondary nitrated paraffins containing from 10 to 24 carbon atoms. These reactants are preferred because:

1. They are potentially available in large quantities from the vapor-liquid phase nitration of normal paraffins as described in the literature,
2. Their beta substituted ethylated addition products are particularly effective plasticizers for vinyl polymers,
3. These nitroparaffin reactants, particularly the secondary nitroparaffins, are recalcitrant to the Michael-type addition using the processes described in the prior art.

The secondary nitroparaffins which are utilized as reactants are principally mixtures having the nitro groups randomly distributed along the hydrocarbon chain. Lower molecular weight nitroparaffins, though less preferred, can also be used as reactants in the inventive process. Illustrative nitroparaffin reactants include nitropropanes, nitrobutanes, nitropentanes, nitrohexanes, nitrocyclohexanes, nitroheptanes, nitrooctanes, nitrononanes, nitrodecanes, nitroundecanes, nitrododecanes, nitrotridecanes, nitrotetradecanes, nitropentadecanes, as well as the higher homologues and mixtures of any or all of these nitroparaffins.

B: Vinyl-type reactants — The vinyl-type reactants which can be employed contain at least 3 carbon atoms and at least one reactive vinyl grouping. The favored vinyl-type reactants are included within the structure:

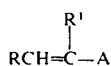

wherein A is selected from the group consisting of —CN, —SO$_2$CH = CH$_2$, — COOR$^2$, — CONH$_2$, — COR$^2$,

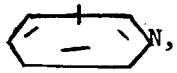

R and R$^1$ are selected from the group consisting of hydrogen and methyl and R$^2$ is selected from the group consisting of alkyl radicals containing 1 to 12 carbon atoms, cycloalkyl radicals containing from 6 to 8 carbon atoms, aryl radicals containing from 6 to 10 carbon atoms.

Illustrative vinyl-type reactants include nitriles such as acrylonitrile, crotonitrile and methacrylonitrile, acrylates such as methyl, ethyl, hexyl, cyclohexyl, allyl, methallyl, 2-ethylhexyl, phenyl, beta-hydroxyethyl, betacyanoethyl, furfuryl, dimethylaminoethyl, furfuryl, diethylaminoethyl and pentachlorophenyl acrylates, diacrylates such as ethylene and propylene diacrylates, vinylpyridines such as 2-vinylpyridines and 4-vinylpyridines, vinyl ketones, such as methyl, ethyl and phenyl vinyl ketones, etc.

The preferred vinyl-type reactants are compounds referred to as acrylate-type structures. These include acrylonitrile, alkyl acrylates, alkyl methacrylates, and the dialkylaminoalkyl methacrylates, containing preferably from 4 to 36 carbon atoms. Illustrative alkyl acrylates include methyl acrylate, ethyl acrylate, stearyl acrylate, and allyl acrylate. Illustrative methacrylates include n-butyl methacrylate, n-octyl methacrylate, lauryl methacrylate and the like. Illustrative dialkylaminoalkyl methacrylates include diethylaminoethyl methacrylate and dipropylaminoethyl methacrylate and the like, while typical dialkylamino acrylates include diethylaminoethyl acrylate and dipropylaminoethyl acrylate among others.

C: Addition — As used throughout this disclosure, this is the generic term used to describe the derivatives which result from the Michael-type of addition of nitroparaffin reactants to the vinyl-type reactants.

D: Anhydrous aprotic solvent environment — The environment used in the inventive process is substantially anhydrous since both the catalyst and solvent used are substantially free from water. The aprotic solvents are dipolar solvents having a dielectric constant F in excess of 15 at 25°C. and cannot donate protons for hydrogen bonding to any appreciable extent. These solvents are resistant to decomposition during the alkaline reaction conditions that prevail during the addition. Illustrative aprotic solvents which may be used include the alkyl sulfoxides such as dimethyl sulfoxide and diisopropyl sulfoxide, tetramethylene sulfone, alkylformamides such as N,N-dimethylformamide, alkyl phosphoramides such as trimethyl phosphoramide and hexamethyl phosphoramide, and thioureas such as N,N-dimethyl thiourea and tetramethyl thiourea.

The preferred aprotic solvents are the alkyl sulfoxides such as dimethyl sulfoxide, the alkylformamides such as N,N-dimethylformamide and the alkyl phosphoramides such as hexamethyl phosphoramide. These solvents are preferred since they are especially good solvents for both the nitroparaffin and vinyl-type reactants and when used as a reaction environment, produce the addition products in good yield. While the volume of aprotic solvent used is not ordinarily critical, it is preferred that sufficient solvent be present to provide a liquid reaction mixture.

E: Strongly alkaline material — This is the generic term used to describe the basic catalysts required for the addition in aprotic solvent. These include liquid ammonia, alkali metal alkoxides, and hydroxides and the alkaline earth hydroxides, as well as other materials that are strongly alkaline in aprotic solvents. Illustrative of these are potassium fluoride and quaternary ammonium hydroxides. The preferred catalysts, because of efficacy, are those selected from the group consisting of alkali metal hydroxides and alkaline earth metal hydroxides. These catalysts are used in concentrations ranging from about 0.75 to 20% by weight or higher based upon the weight of the nitroparaffin reactant used. This concentration range is herein referred to throughout this application as a catalytic quantity (or amount) of catalyst. The preferred concentration of catalyst which ordinarily will suffice for good yields varies between about 1 to 13% by weight based upon the nitroparaffin reactant.

F: Reaction Conditions

1. Reaction Temperatures — The reaction temperatures necessary for the addition to take place are relatively flexible. For example, temperatures between about 20° and 150°C. can be employed to form the adducts of this invention. However, the best results have been obtained when a narrower temperature range is employed. This preferred temperature range is between about 50° and 80°C.

2. Reaction Pressures — Atmospheric pressures are generally preferred since they are sufficient to produce the desired addition products in good yield without the need for more costly pressurized equipment. However, if desired, superatmospheric pressures can be employed, particularly where anhydrous ammonia or a comparable gaseous material is used in the reaction.

3. Reaction Time — The reaction time required for significant formation of the addition products is a variable dependent upon the nitroparaffin and vinyl-type reactants and the reaction temperatures employed. Generally, however, substantial quantities of product form within 1 to 24 hours at the preferred temperatures when acrylonitrile and the secondary nitroparaffins are the reactants.

4. Molar Ratios — Ordinarily, near equimolar ratios of nitroparaffin to vinyl-type reactant are employed. However, the favored procedure is to use a 0.1 molar excess of vinyl-type reactant to nitroparaffin. Preferably the ratio of vinyl-type reactant to nitroparaffin reactant will vary from 1.1:1 to 2:1 when the secondary nitroparaffins containing 10 to 24 carbon atoms are reacted with a vinyl-type reactant such as acrylonitrile, alkyl acrylate or alkyl methacrylate.

5. Additional Inert Solvent — While ordinarily the addition is conducted in a substantially anhydrous environment comprising one or more aprotic solvents the presence of additional inert solvent is not detrimental. For example, where the preferred nitroparaffin reactants (the mixtures of secondary nitroparaffins containing 10 to 24 carbon atoms) are obtained from vapor-liquid phase nitration they are accompanied with from 50 to 85% by weight or more of unreacted paraffins. In these instances it is convenient to conduct the addition in the presence of these paraffinic, or comparable, inert solvents. This, in fact, can readily be done and is one of the salient advantages of the inventive process.

6. Isolation and Purification of Addition Product — After the addition is complete the reaction mixture is cooled and neutralized with an acidic reagent. When an alkaline earth metal hydroxide is used as catalyst it is convenient to neutralize with carbon dioxide and remove the insoluble carbonate which precipitates. When the alkali metal hydroxides are used as catalyst a mineral acid, such as hydrochloric or sulfuric, is used to neutralize the reaction mixture. After the neutralization is complete, the method of isolation depends upon the solvent environment used. Where only aprotic solvent is present, the reaction mixture is cooled, neutralized and sufficient water added to form two phases. The organic phase which contains the addition product is separated under vacuum and the product isolated. In either case, the adduct products can be further purified by vacuum distillation or by percolation through materials such as alumina or silica gel.

7. Order of Addition of Reactants — There is no critical order of addition of the reactants. However, consistently high yields are obtained when the nitroparaffin, aprotic solvent and strongly alkaline catalyst are charged into the reaction vessel and the vinyl-type reactant is added dropwise to the stirred reaction mixture. The rate of addition is regulated to maintain the temperature between about 50° and 80°C.

G: Cyanoethylated Nitroparaffins — As indicated earlier when the nitroparaffins are added to acrylonitrile the addition products are cyanoethylated products, formed as shown below:

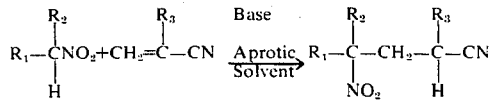

wherein $R_1$, $R_2$, and $R_3$ are selected from the group consisting of hydrogen and alkyl radicals containing from 1 to 12 carbon atoms, straight chain or branched chain.

When the addition products contain at least 13 carbon atoms they are useful as plasticizers for vinyl-type polymers such as polyvinyl chloride and polyvinyl acetate. When used for this purpose the formulations are prepared by mixing from 15 to 70 parts by weight of the addition product with from 90 to 120 parts by weight of the polyvinyl polymer and 1 to 10 parts by weight of at least one thermal stabilizer. The mixture of ingredients is placed in a shearing-type mixer at room temperature, preferably below 90°F. and later subjected to vacuum to remove any air intrapped during mixing. To obtain optimum physical properties it is necessary to expose the mixture of ingredients to elevated temperatures, preferably between 300°–375°F. The resultant polymers have improved low temperature flexibility, good tensile modulus and improved resistance to extraction with hexane and soap and water compared to polymers containing nitroparaffins plasticizers.

In order to describe the novel process in the greatest possible detail, the following illustrative examples are submitted.

EXAMPLE 1

Preparation of Cyanoethylated Derivatives of a Mixture of Secondary Nitroparaffins Containing from 10 to 14 Carbon Atoms Using the Inventive Process To an appropriate reaction vessel equipped with thermometer heating and stirring means are added 500 parts by weight of a mixture of $C_{10}$ to $C_{14}$ secondary nitroparaffins (derived in this instance, by the vapor-liquid phase nitration of the corresponding paraffins with nitrogen dioxide), 180 parts by weight of acrylonitrile, 4 parts by weight of powdered sodium hydroxide and 1200 parts by weight of N, N-dimethylformamide. The reaction mixture is heated with stirring to 70°C. for 22 hours. At the end of this time the reaction mixture is allowed to cool to room temperature and the stirred mixture is treated with 5 parts by weight of concentrated hydrochloric acid to neutralize it and 1200 parts by weight of water. Two phases are produced, the upper organic phase containing virtually uncontaminated cyanoethylated product and the bottom aqueous phase containing the N, N-dimethylformamide solvent. After separation the upper layer is analyzed by infrared and gas chromatography which establish that a 96% yield of $\beta$-(2-cyanoethyl)$C_{10}$–$C_{14}$ nitroparaffin product is obtained based upon nitroparaffin starting material. As can be seen from the following example, this is a substantial increase over what is normally obtained using the prior art process.

EXAMPLE 2

Preparation of Cyanoethylated Derivatives of a Mixture of Secondary Nitroparaffins Containing From 10 to 14 Carbon Atoms Using the Process of the Prior Art The procedure of Example 1 is followed exactly using the same reactants, catalyst and quantities of reactants. Only the solvents employed differ. In this run a 700 by weight portion of methanol is substituted for N,N-dimethylformamide used in Example 1. After heating for 24 hours at 65°C., the reaction mixture is neutralized as before after cooling. However, in order to separate the addition product it is necessary to strip off all of the methanol and unreacted nitroparaffin. Prior to stripping, infrared and gas chromatography establish that a yield of 67.3% of the mixed product is obtained based upon starting nitroparaffin. This is 30% less than is obtained in the preceding example using the inventive process. Repeat runs established that this difference is a real difference and demonstrates the superiority of the inventive process.

EXAMPLE 3

Preparation of Cyanoethylated Derivatives of Mixed Secondary Nitroparaffins in the Presence of Paraffinic Contaminant To an appropriate reaction vessel equipped with thermometer heating and stirring means are added 100 parts by weight of a mixture of secondary $C_{10}$–$C_{14}$ nitroparaffins and secondary $C_{10}$–$C_{14}$ paraffins (comprising 25 parts by weight of the nitroparaffins and 75 parts by weight of paraffins) 9.5 parts by weight of acrylonitrile, 4 parts by weight of powdered sodium hydroxide and 150 parts by weight of N-N-dimethylformamide. The reaction mixture is heated with stirring to 70°C. for 6 hours. At the end of this time the reaction mixture is allowed to cool to room temperature and the stirred, cooled mixture treated with 10 parts by weight of concentrated hydrochloric acid, 100 parts by weight of water and 100 parts by weight of petroleum ether. Two phases separate and the upper organic phase is removed, dried, and stripped under vacuum to give 99 parts by weight of a product which infrared and gas chromatographic analysis confirm to be 67.2 parts by weight of paraffin and 32.9 parts by weight of cyanoethylated $C_{10}$–$C_{14}$ nitroparaffins. No unreacted nitroparaffin is observed.

EXAMPLE 4

Preparation of α (2-Propionylethyl) $C_{10}$–$C_{14}$ Nitroparaffins

Using the procedure described in Example 1, a stirred reaction mixture comprising 110 parts by weight of $C_{10}$–$C_{14}$ secondary nitroparaffins, 45 parts by weight of ethyl vinyl ketone, 0.9 parts by weight of powdered potassium hydroxide and 200 parts by weight of N,N-dimethylformamide is heated for 26 hours at 73°C., cooled to room temperature and acidified with 5 parts by weight of concentrated hydrochloric acid. Upon separation and purification, 51.6 parts by weight of product are obtained which infrared and gas chromatographic analysis confirm to be the desired α(2 - propionylethyl) $C_{10}$–$C_{14}$ nitroparaffin product.

EXAMPLES 5 TO 7

Preparation of Three Other Beta Substituted $C_{10}$–$C_{14}$ Secondary Nitroparaffin Products Using the procedure of Example 1 two separate reaction mixtures are heated for 30 hours at 80°C. with stirring, neutralized with concentrated hydrochloric acid, separated and analyzed.

The first reaction mixture comprised 22 parts by weight of $C_{10}$–$C_{14}$ secondary nitroparaffins, 15 parts by weight of phenyl vinyl ketone, 5 parts by weight of powdered potassium hydroxide and 200 parts by weight of N, N-dimethylformamide to produce α-(2-benzoylethyl) $C_{10}$–$C_{14}$ nitroparaffin product.

The second reaction mixture which comprises 22 parts by weight of $C_{10}$–$C_{14}$ secondary nitroparaffins, 14 parts by weight of 2-vinylpyridine-N-oxide, 5 parts by weight of powdered potassium hydroxide 200 parts by weight of N,N-dimethylformamide produces (after work-up) α-(2-[2-pyridyl-N-oxide] ethyl) $C_{10}$–$C_{14}$ nitroparaffins product.

The third reaction mixture is identical to the second reaction mixture except that 4-vinylpyridine-N-oxide is the vinyl reactant. After work-up the product is α-(2-[4-pyridyl-N-oxide] ethyl) $C_{10}$–$C_{14}$ nitroparaffin product.

EXAMPLE 8

Cyanoethylation of Nitrododecane

To a reaction vessel such as is described in the previous examples is added 44 parts by weight of nitrododecane, 13 parts by weight of acrylonitrile and 1 part of powdered potassium hydroxide in 100 parts by weight of N,N-dimethylformamide. The reaction mixture is heated with stirring at 75°C. for 24 hours. At the end of this time the reaction mixture is allowed to cool to room temperature and the stirred, cooled mixture is treated with 18 parts by weight of concentrated hydrochloric acid, 75 parts by weight of water and 75 parts by weight of petroleum ether. The organic phase which separates is removed, dried and stripped under vacuum to yield 53 parts by weight of a product which elemental infrared and gas chromatographic analysis establish to be β-(2-cyanoethyl) nitrododecane.

EXAMPLE 9

Preparation of a Michael-Type Addition Product of Nitrododecane with Methyl Acrylate Using the previously described inventive procedure, 44 parts by weight of nitrododecane, 22 parts by weight of methyl - acrylate and 2 parts by weight of powdered potassium hydroxide are dispersed in 150 parts by weight of N,N-dimethylformamide and heated to 75°C. for 24 hours. After acidification and the addition of 75 parts by weight of water and 75 parts by weight petroleum ether two phases separate. The organic phase is separated, dried and volatiles stripped off. A yield of approximately 60 parts by weight of a product that elemental infrared and gas chromatography analysis confirm to be beta-(2-carbonylmethoxyethyl) nitrododecane is obtained.

EXAMPLES 10 TO 30

Preparation of Other Michael-Type Addition Products

In these examples the procedure described in Example 1 is followed from reaction through isolation. In all instances, parts and percentages are by weight. The summary of these examples appear in Table I which follow:

TABLE I

| EXAMPLE | REACTANTS - PARTS BY WEIGHT Nitroparaffin | Vinyl-type Compounds | SOLVENT-Parts by Wt. | Strongly Alkaline Material Parts By Weight | % Yield |
|---|---|---|---|---|---|
| 10 | Mixture Secondary $C_{10}$–$C_{14}$ Nitroparaffin 110 parts | Methyl Vinyl Ketone 45 parts | N,N-dimethylformamide 200 parts | Potassium Hydroxide 1.0 parts | 64.5% |
| 11 | $C_{10}$–$C_{14}$ Nitroparaffin 22 parts | 2-Vinyl Pyridine 10 - 5 parts | N,N-dimethylformamide 100 parts | Potassium Hydroxide 1.0 parts | 57.3% |
|  |  |  |  | Potassium | 88.4% |

TABLE I-continued

| EXAMPLE | REACTANTS - PARTS BY WEIGHT Nitroparaffin | Vinyl-type Compounds | SOLVENT-Parts by Wt. | Strongly Alkaline Material Parts By Weight | % Yield |
|---|---|---|---|---|---|
| 12 | $C_{10}-C_{14}$ Nitroparaffin 168 parts | Divinyl Sulfone 51 parts | N,N-dimethylformamide 175 parts | Potassium Hydroxide 1.5 parts | of BIS Adduct |
| 13 | $C_{10}-C_{14}$ Nitroparaffin 53 parts | Dimethylamino-ethyl acrylate 42 parts | N,N-dimethylformamide 150 parts | Potassium Hydroxide 1.5 parts | 97.0% |
| 14 | $C_{10}-C_{14}$ Nitroparaffin 51 parts | Allyl acrylate 33 parts | N,N-dimethylformamide 150 parts | Potassium Hydroxide 1.5 parts | 98.0% Mono |
| 15 | $C_{10}-C_{14}$ Nitroparaffin 66 parts | Ethylene Diacrylate 52 parts | N,N-dimethylformamide 250 parts | Potassium Hydroxide 1.5 parts | Adduct 85.0% |
| 16 | $C_{10}-C_{14}$ Nitroparaffin 44 parts | Hexyl acrylate 32 parts | N,N-dimethylformamide 150 parts | Potassium Hydroxide 1.5 parts | 94.2% |
| 17 | 2-Nitropropane 89 parts Mixture Secondary | Methyl acrylate 90 parts | N,N-dimethylformamide 150 parts | Potassium Hydroxide 1.0 parts | 98.9% |
| 18 | $C_{10}-C_{14}$ Nitroparaffins 110 parts | Furfuryl acrylate 84 parts | N,N-dimethylformamide 250 parts | Potassium Hydroxide 3.5 parts | 95.8% |
| 19 | $C_{10}-C_{14}$ Nitroparaffins 108 parts | Methallyl acrylate 75 parts | N,N-dimethylformamide 200 parts | Potassium Hydroxide 1.0 parts | 95.4% |
| 20 | $C_{10}-C_{14}$ Nitroparaffins 115 parts Mixture Secondary | Diethylamine acrylate 100 parts | N,N-dimethylformamide 300 parts | Potassium Hydroxide 2.0 parts | 68.1% |
| 21 | $C_{10}-C_{14}$ Nitroparaffin 108 parts | Phenyl acrylate 82.0 parts | N,N-dimethylformamide 250 parts | Sodium Hydroxide 2.1 parts | 95.0% |
| 22 | $C_{10}-C_{14}$ Nitroparaffin 44 parts | Butyl acrylate 29 parts | N,N-dimethylformamide 150 parts | Potassium Hydroxide 5 parts | 97.8% |
| 23 | $C_{10}-C_{14}$ Nitroparaffin 45 parts | Lauryl acrylate 51 parts | N,N-dimethylformamide 200 parts | Potassium Hydroxide 5 parts | 77.0% |
| 24 | $C_{10}-C_{14}$ Nitroparaffin 44 parts | 2-Ethylhexyl acrylate 41 parts | N,N-dimethylformamide 200 parts | Potassium Hydroxide 10 parts | 91.0% |
| 25 | $C_{10}-C_{14}$ Nitroparaffin 44 parts | Cyclohexyl acrylate 31 parts | N,N-dimethylformamide 200 parts | Potassium Hydroxide 4 parts | 95.4% |
| 26 | $C_{10}-C_{14}$ Nitroparaffin 44 parts | Crotononitrile 13 parts | N,N-dimethylformamide 100 parts | Potassium Hydroxide 1 part | 30.4% |
| 27 | $C_{10}-C_{14}$ Nitroparaffin 44 parts | Methacrylonitrile 13 parts | N,N-dimethylformamide 100 parts | Potassium Hydroxide 2 parts | 13.1% |
| 28 | $C_{10}-C_{14}$ Nitroparaffin 44 parts | Acrylonitrile 6.5 parts | Dimethyl sulfoxide 50 parts | Potassium Hydroxide 2 parts | * |
| 29 | $C_{10}-C_{14}$ Nitroparaffin 44 parts | Crotononitrile 15 parts | Hexamethyl Phosphoramide 50 parts | Potassium Hydroxide 2 parts | ** 10.4% |
| 30 | $C_{10}-C_{14}$ Nitroparaffin 44 parts | Methyl acrylate | N,N-dimethylformamide | Hydroxide 5 parts | Above 90% |

*Infrared analysis establishes the expected product forms.
**Run in autoclave under autogenous pressure.

EXAMPLES 31 TO 44

Preparation of Individual Michael-Type Adducts of $C_{10}$ to $C_{14}$ Nitroparaffins with Vinyl-Type Reactant In these runs specific $C_{10}-C_{14}$ nitroparaffins are reacted with designated reactant on a 1:2 molar basis in a N,N-dimethylformamide solvent environment (100ml) at 75°C. in the presence of 2% by wt. KOH (based on nitroparaffin content) using the procedure described in Example 1. In each instance yields of 60% or more are obtained of the indicated beta-substituted ethylated product as confirmed by infrared, gas chromatography and nuclear magnetic resonance data. The results are shown in the table below.

TABLE II

| Example | Nitroparaffin | Vinyl-Type Reactant | Product |
|---|---|---|---|
| 31 | sec.nitrodecane | acrylonitrile | β-(2-cyanoethyl) nitrodecane |
| 32 | sec.nitrodecane | methallyl acrylate | β-(2-carbonyl-methalloxyethyl) nitrodecane |
| 33 | sec.nitroundecane | acrylonitrile | β-(2-cyanoethyl) nitroundecane |
| 34 | sec.nitroundecane | methallyl acrylate | β-(2-carbonyl-methallyloxyethyl) nitroundecane |
| 35 | sec.nitrododecane | acrylonitrile | β-(2-cyanoethyl) nitrododecane |
| 36 | sec.nitrododecane | methallyl acrylate | β-(2-carbonyl-methallyloxyethyl) nitrododecane |
| 37 | sec.nitrotridecane | acrylonitrile | β-(2-cyanoethyl nitrotridecane |
| 38 | sec.nitrotridecane | methallyl acrylate | β-(2-carbonyl-methallyloxyethyl) nitrotridecane |
| 39 | sec.nitrotetradecane | acrylonitrile | β-(2-cyanoethyl) |

TABLE II-continued

| Example | Nitroparaffin | Vinyl-Type Reactant | Product |
| --- | --- | --- | --- |
| 40 | sec.nitrotetradecane | acrylonitrile | β-(2-cyanoethyl) nitrotetradecane |
| 41 | sec.nitrotetradecane | methyallyl acrylate | β-(2-carbonyl-methallyloxyethyl) nitrotetradecane |
| 42 | sec.nitrotetradecane | methallyl acrylate | β-(2-carbonyl-methallyloxyethyl) nitrotetradecane |
| 43 | sec.nitrodecane | methyl acrylate | β-(2-carbonyl-methoxyethyl) nitrodecane |
| 44 | sec.nitrododecane | methyl acrylate | β-(2-carbonyl-methoxyethyl) nitrododecane |

EXAMPLES 45 TO 49

Evaluation of Illustrative Beta-Substituted Ethylated Adducts Prepared From Nitroparaffins and Vinyl-Type Compounds as Plasticizers for Polyvinyl Chloride Polymers In these examples the designated adducts are formulated with polyvinyl chloride and an antioxidant using the procedure described below:

A 50 parts by weight portion of the adduct being evaluated as plasticizers is blended with 1.5 parts by weight of antioxidant (Thermolite 31) and 100 parts by weight portion of commercially obtained polyvinyl chloride is blended into the mixture. The polymer blend is slowly added to the mill rolls of a mill whose roller speed is maintained at 20 feet per minute at 350°F. and whose back roller temperature is maintained at 375°F. After all of the polymer blend is added to the rollers (usually 3–4 minutes) the mixing is continued on the rollers. After each milling run, the milled polymer is removed and the milling process is repeated 4 to 6 times for a total of 12–16 minutes. At this time the blended and milled polymer is removed and molded using two molds both 8½ inches × 10 inches and having a capacity of 10 ml. and the second a 75 ml. capacity.

The molding is done at 350°F. with a pressure of 25 tons, and a molding time of 8 minutes.

Table III which follows summarizes the physical characteristics of polyvinyl chloride polymers plasticized with various adducts of the invention when evaluated according to standard testing procedures.

As a basis for making an evaluation of the invention adducts as plasticizers, the same polyvinyl chloride polymer and antioxidant are blended in the same proportion with a commercially employed plasticizer diisooctyl phthalate and also with a mixture of $C_{10}$–$C_{14}$ nitroparaffins. All of the materials are milled and molded under identical conditions and temperatures to produce the polymer compositions. The results obtained when this composition is exposed to the same tests are also given in Table III.

TABLE III

| Ex. | COMPOUNDS EVALUATED | Tensile Mod. psi at 100% Elong. | Tensile Mod. psi at Break | Shore Hardness "A" | % Elong. at Break | % Extrn. With Soapy Water | % Extrn. With Hexane | % Carbon Volatility | Clash Berg Temp. at G=45000 psi |
| --- | --- | --- | --- | --- | --- | --- | --- | --- | --- |
| 45 | Disooctyl Phthalate | 1400 | 2880 | 84.2 | 360 | 5.2 | 21.0 | 1.5 | −16 |
| 46 | ($C_{10}$–$C_{14}$) Nitroparaffin Mixture | 1350 | 2970 | 83.9 | 350 | 12.0 | 11.0 | 14.0 | −23 |
| 47 | Adduct of Ex. 1 | 1147 | 2906 | 80.4 | 410 | 10.0 | 3.7 | 7.4 | −21 |
| 48 | Adduct of Ex. 3 | 1127 | 2788 | 78.7 | 382 | 11.2 | 11.5 | 8.6 | −18 |
| 49 | Adduct of Ex. 18 | 1224 | 2806 | 82.6 | 420 | 6.8 | 23.2 | 2.9 | −23 |
| 50 | Adduct of Ex. 6 | 1071 | 2873 | 77.8 | 382 | 10.7 | 7.7 | 11.8 | −17 |
| 51 | Adduct of Ex. 20 | 1570 | 2959 | — | 390 | — | — | — | — |
| 52 | Adduct of Ex. 21 | 1750 | 3179 | — | 336 | 3.6 | 10.0 | 1.3 | −4 |
| 53 | Adduct of Ex. 10 | 1278 | 3005 | 84.3 | 420 | 10.9 | 14.4 | 7.9 | −21.5 |
| 54 | Adduct of Ex. 12 | 1474 | 2912 | 87.3 | 397 | 34.6 | 22.7 | 2.3 | −20 |
| 55 | Adduct of Ex. 14 | 1715 | 3154 | 89.0 | 360 | 7.5 | 4.4 | 2.0 | −7 |
| 56 | Adduct of Ex. 15 | 1300 | 2711 | 84.0 | 330 | 5.7 | 12.3 | 4.0 | −19 |
| 57 | Adduct of Ex. 17 | 1763 | 3317 | 85.4 | 347 | 6.5 | 3.2 | 2.0 | 0 |

As the numerous examples and suggested embodiments indicate, this invention is advantageous in several respects. For example, the inventive process is advantageous in that it permits the use of secondary nitroparaffins containing 10 and higher carbon atoms as reactants in Michael-type additions without adversely affecting yields. In addition, these nitroparaffin reactants can be in the form of the solvent-free individual compounds of their mixtures, or the nitroparaffin reactants can contain a large quantity of inert solvent such as the paraffins. Further, the good yield of addition products is obtained within short reaction times without the use of pressurized systems at relatively low reaction temperatures.

In its product aspect this invention provides heretofore unknown adducts of $C_{10}$ and higher nitroparaffins with vinyl-type materials. These products are useful generally as bifunctional intermediates and as plasticizers for polyvinyl polymers.

The preceding specification demonstrates that numerous changes, modifications and substitutions can be made in the practice of this invention without departing from the inventive concept. The metes and the bounds of this invention can be determined by the claims which follow read in conjunction with the specification.

What is claimed is:

1. β-(2-carbonylmethoxyethyl) secondary $C_{10}$–$C_{14}$ nitroparaffins.

* * * * *

UNITED STATES PATENT AND TRADEMARK OFFICE
CERTIFICATE OF CORRECTION

PATENT NO. : 3,923,846

DATED : DECEMBER 2, 1975

INVENTOR(S) : WHEELER C. CRAWFORD; WILLIAM P. DOYLE; JOHN A. PATTERSON

It is certified that error appears in the above-identified patent and that said Letters Patent are hereby corrected as shown below:

INVENTOR'S NAME WHELLER C. CRAWFORD SHOULD READ
--WHEELER C. CRAWFORD--

COL. 1, line 60, "vinyl-tape" should read --vinyl-type--

COL. 8, TABLE I, last line under "% Yield, "88.4% should be deleted

COL. 9, EXAMPLE 12, last line under "% Yield, insert --88.4%--

COL. 9, EXAMPLE 17, first column under "Nitroparaffin" delete "Mixture Secondary" and insert "Mixture Secondary" on next line, as part of Example 18.

Signed and Sealed this thirteenth Day of April 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,923,846
DATED : December 2, 1975
INVENTOR(S) : Wheeler C. Crawford, William P. Doyle, John A. Patterson It is certified that error appears in the above-identified patent and that said Letters Patent are hereby corrected as shown below:

The inventor's name "WHELLER C. CRAWFORD" should read
--WHEELER C. CRAWFORD--

Col. 1, line 60, "vinyl-tape" should read
--vinyl-type--

Col. 8, Table I last column under Example 11, "88.4%" should appear under Example 12, last column.

Col. 9, Table I, "Mixture Secondary" should be moved one space to be part of Example 18.

Signed and Sealed this

Twentieth Day of July 1976

[SEAL]

Attest:

RUTH C. MASON
Attesting Officer

C. MARSHALL DANN
Commissioner of Patents and Trademarks